United States Patent
Murata

(10) Patent No.: US 12,155,187 B2
(45) Date of Patent: Nov. 26, 2024

(54) WIRING MEMBER AND RETAINING MEMBER

(71) Applicant: SUMITOMO WIRING SYSTEMS, LTD., Mie (JP)

(72) Inventor: Takahiro Murata, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 210 days.

(21) Appl. No.: 17/909,974

(22) PCT Filed: Mar. 12, 2020

(86) PCT No.: PCT/JP2020/010730
§ 371 (c)(1),
(2) Date: Sep. 7, 2022

(87) PCT Pub. No.: WO2021/181596
PCT Pub. Date: Sep. 16, 2021

(65) Prior Publication Data
US 2023/0123947 A1  Apr. 20, 2023

(51) Int. Cl.
*H02G 3/04* (2006.01)
*H02G 3/06* (2006.01)
*H01B 7/00* (2006.01)

(52) U.S. Cl.
CPC .......... *H02G 3/0406* (2013.01); *H02G 3/06* (2013.01); *H01B 7/009* (2013.01); *H02G 3/0462* (2013.01); *H02G 3/0468* (2013.01)

(58) Field of Classification Search
CPC ...... H02G 3/0406; H02G 3/06; H02G 3/0462; H02G 3/0468; H01B 7/009
(Continued)

(56) References Cited

U.S. PATENT DOCUMENTS

| 9,337,634 B2 * | 5/2016 | Sato ..................... H02G 3/0481 |
| 2008/0277015 A1 * | 11/2008 | Tanaka ................. H02G 3/0468 138/121 |

(Continued)

FOREIGN PATENT DOCUMENTS

| CN | 112103871 | * 12/2020 |
| JP | 2003-279755 A | 10/2003 |

(Continued)

OTHER PUBLICATIONS

International Search Report issued on May 12, 2020 for WO 2021/181596 A1 (6 pages).

*Primary Examiner* — Timothy J Thompson
*Assistant Examiner* — Michael F McAllister
(74) *Attorney, Agent, or Firm* — Venjuris, P.C.

(57) ABSTRACT

A wiring member including: three or more electrical wire portions extending in different directions from a branching position; and a retaining member that is an elastic member and covers base end portions of the three or more electrical wire portions. The retaining member includes three or more cylindrical portions that are joined to each other at respective base end portions thereof, one or two adjacent cylindrical portions of the three or more cylindrical portions being a base cylindrical portion provided with a slit extending over the entire length thereof on one side, and the remaining cylindrical portion being a divided cylindrical portion provided with slits extending over the entire length thereof on two sides, and the retaining member is closed via a fixing member.

14 Claims, 5 Drawing Sheets

(58) Field of Classification Search
USPC .......................................................... 174/72 R
See application file for complete search history.

(56) References Cited

U.S. PATENT DOCUMENTS

| | | | |
|---|---|---|---|
| 2018/0331528 A1 | 11/2018 | Takahashi | |
| 2019/0319437 A1* | 10/2019 | Chu | ..................... H02G 3/0691 |
| 2023/0083925 A1* | 3/2023 | Takahashi | ........... B60R 16/0215 |
| | | | 174/77 R |

FOREIGN PATENT DOCUMENTS

| | | | |
|---|---|---|---|
| JP | 2007-288972 A | | 11/2007 |
| JP | 2011-239619 A | | 11/2011 |
| JP | 2012195998 | * | 10/2012 |
| JP | 2014-204464 A | | 10/2014 |
| JP | 2015-146670 A | | 8/2015 |
| JP | 2016-165171 A | | 9/2016 |
| JP | 2016165171 | * | 9/2016 |
| JP | 2018-046616 A | | 3/2018 |

* cited by examiner

WIRING MEMBER AND RETAINING MEMBER

CROSS REFERENCE TO RELATED APPLICATIONS

This application is a national phase of PCT application No. PCT/JP2020/010730, filed on 12 Mar. 2020, the disclosure of which is incorporated herein by reference.

TECHNICAL FIELD

The present disclosure relates to a wiring member and a retaining member.

BACKGROUND

Patent Document 1 discloses technology for retaining the shape of a branched portion of a wire harness using a protector formed in a branched shape. In the technology disclosed in Patent Document 1, the branched shape can be easily retained by housing an electrical wire in the protector.

PRIOR ART DOCUMENT

Patent Document

Patent Document 1: JP 2015-146670 A

SUMMARY OF THE INVENTION

Problems to be Solved

However, the protector disclosed in Patent Document 1 is often a highly rigid member, and thus the space occupied by the protector may increase.

Thus, it is an object of the present disclosure to provide a technology that makes it possible to easily retain a branched shape of a wiring member and secure space for disposing the wiring member.

Means to Solve the Problem

A wiring member according to the present disclosure is a wiring member including: three or more electrical wire portions extending in different directions from a branching position; and a retaining member that is an elastic member and covers base end portions of the three or more electrical wire portions, wherein the retaining member includes three or more cylindrical portions that are joined to each other at respective base end portions thereof, one or two adjacent cylindrical portions of the three or more cylindrical portions is a base cylindrical portion provided with a slit extending over the entire length thereof on one side, and the remaining cylindrical portion is a divided cylindrical portion provided with slits extending over the entire length thereof on two sides, and the retaining member is closed via a fixing member.

Effect of the Invention

According to the present disclosure, it is easy to retain a branched shape of the wiring member and secure space for disposing the wiring member.

DETAILED DESCRIPTION TO EXECUTE THE INVENTION

Description of Embodiments of Present Disclosure

Figure 1:
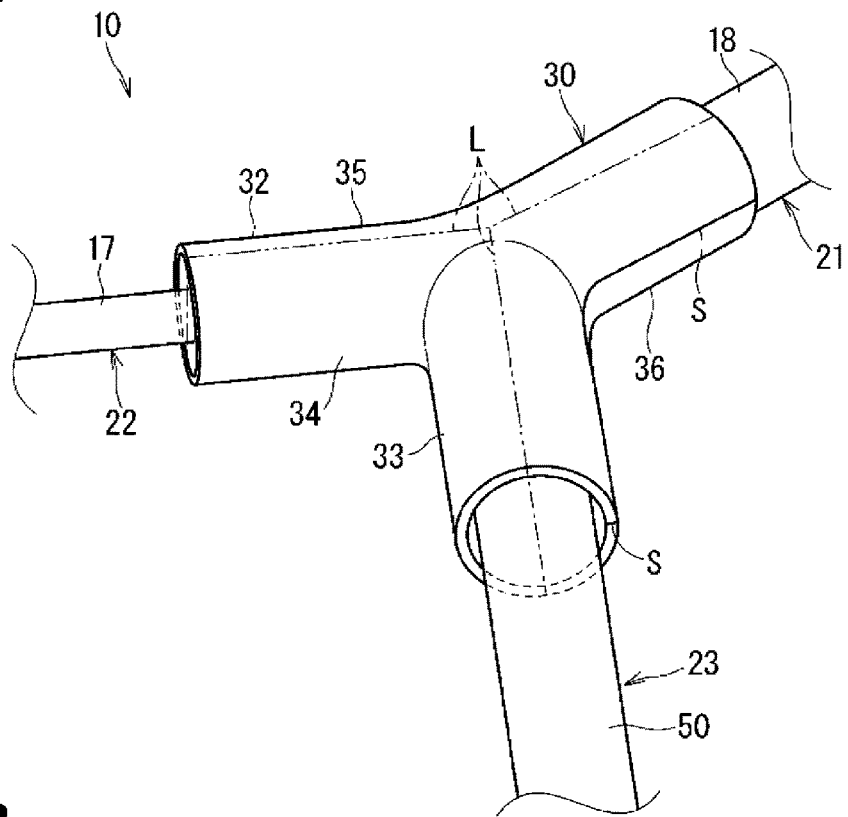
FIG. 1 is a schematic perspective view showing a wiring member according to Embodiment 1.

First, embodiments of the present disclosure will be listed and described below.

A wiring member of the present disclosure is as follows.

(1) A wiring member including: three or more electrical wire portions extending in different directions from a branching position; and a retaining member that is an elastic member and covers base end portions of the three or more electrical wire portions, wherein the retaining member includes three or more cylindrical portions that are joined to each other at respective base end portions thereof, one or two adjacent cylindrical portions of the three or more cylindrical portions is a base cylindrical portion provided with a slit extending over the entire length thereof on one side, and the remaining cylindrical portion is a divided cylindrical portion provided with slits extending over the entire length thereof on two sides, and the retaining member is closed via a fixing member. The retaining member includes base cylindrical portions and a divided cylindrical portion, and thus the operation of inserting the electrical wire portions from the end portion openings of the cylindrical portions is not required, and the electrical wire portions can be easily housed in the cylindrical portions. Also, by providing the fixing members, the branched shape is retained. Accordingly, the branched shape can be easily retained. The retaining member is an elastic member, and thus the retaining member can be made smaller and be deformed. Accordingly, the space for disposing the wiring member can be easily secured.

(2) The wiring member according to (1) may further include a protective member provided on at least one of the three or more electrical wire portions. Thus, the electrical wire portion is protected by the protective member.

(3) In the wiring member according to (2), a configuration is possible where the protective member is a cylindrical member. Thus, by housing the electrical wire portion in the cylindrical protective member, a portion of the electrical wire portion corresponding to the length of the protective member is covered.

(4) In the wiring member according to (2) or (3), a configuration is possible where one end portion of the protective member is covered by the cylindrical portion. Thus, the electrical wire portion to which the protective member is attached can be kept from being exposed.

(5) In the wiring member according to (2) or (3), a configuration is possible where one end portion of the protective member covers the cylindrical portion. Thus, the electrical wire portion to which the protective member is attached can be kept from being exposed.

(6) In the wiring member according to (2) or (3), a configuration is possible where one end portion of the protective member is provided outside of the cylindrical portion in a longitudinal direction of the electrical wire portion. Thus, the protective member and the cylindrical portion can be kept from overlapping, and the wiring member can be kept from being thick at the end portion of the cylindrical portion.

(7) In the wiring member according to any one of (1) to (6), a configuration is possible where the fixing member is adhesive tape, and the adhesive tape closes off the entirety of the slits. Thus, foreign matter can be kept from entering the retaining member via the slits.

(8) In the wiring member according to any one of (1) to (7), a configuration is possible where one of the three or more electrical wire portions is a trunk wire, and the remaining electrical wire portions are branch wires that are branched from the trunk wire, the trunk wire is a cable that includes the plurality of electrical wires, and a sheath that covers the plurality of electrical wires, and an end portion of the sheath is covered by the cylindrical portion. Thus, the electrical wires are protected by the sheath in the trunk wire.

(9) In the wiring member according to (8), a configuration is possible where the three or more electrical wire portions are three electrical wire portions, and the two cylindrical portions housing the two branch wires are the base cylindrical portions. Thus, the portion where the two branch wires branch from the leading end of the trunk wire can be abutted against the base cylindrical portions.

(10) In the wiring member according to (9), a configuration is possible where an angle formed by the two base cylindrical portions is smaller than or equal to respective angles formed by the divided cylindrical portion housing the trunk wire and the two base cylindrical portions. Thus, the angle between the two branch wires is reduced.

(11) In the wiring member according to any one of (1) to (10), a configuration is possible where the three or more cylindrical portions all have the same thickness. Thus, the versatility of the retaining member is increased.

(12) In the wiring member according to any one of (1) to (11), a configuration is possible where the retaining member can be opened/closed from the base cylindrical portion in order to house the three of more electrical wire portions, before being attached to the plurality of electrical wires, and the fixing member keeps the retaining member in a closed orientation. Thus, housing of the electrical wires and retaining of the branched shape are facilitated.

(13) A retaining member including three or more cylindrical portions that are molded components made of an elastic material and are joined to each other at respective base end portions, wherein one or two adjacent cylindrical portions of the three or more cylindrical portions is a base cylindrical portion provided with a slit extending over the entire length thereof on one side, and the remaining cylindrical portion is a divided cylindrical portion provided with slits extending over the entire length thereof on two sides, and the retaining member can be opened/closed from the base cylindrical portion. The retaining member can be opened/closed from the base cylindrical portions, and thus the operation of inserting the electrical wires into the cylindrical portions is not required, and the electrical wire portions can be easily housed in the cylindrical portions. Also, by housing the electrical wires in the cylindrical portions and providing the fixing members, the branched shape is retained. Accordingly, the branched shape can be easily retained. The retaining member is a molded component made of an elastic material, and thus the retaining member can be made smaller and be deformed. Accordingly, the space in which the wiring member is to be disposed can be easily secured.

DETAILED DESCRIPTION OF EMBODIMENT OF THE PRESENT DISCLOSURE

Specific examples of a wiring member and a retaining member of the present disclosure will be described below with reference to the drawings. Note that the present disclosure is not limited to these illustrative examples, but is indicated by the claims, and all changes that come within the meaning and range of equivalency of the claims are intended to be embraced therein.

Embodiment 1

Figure 2:
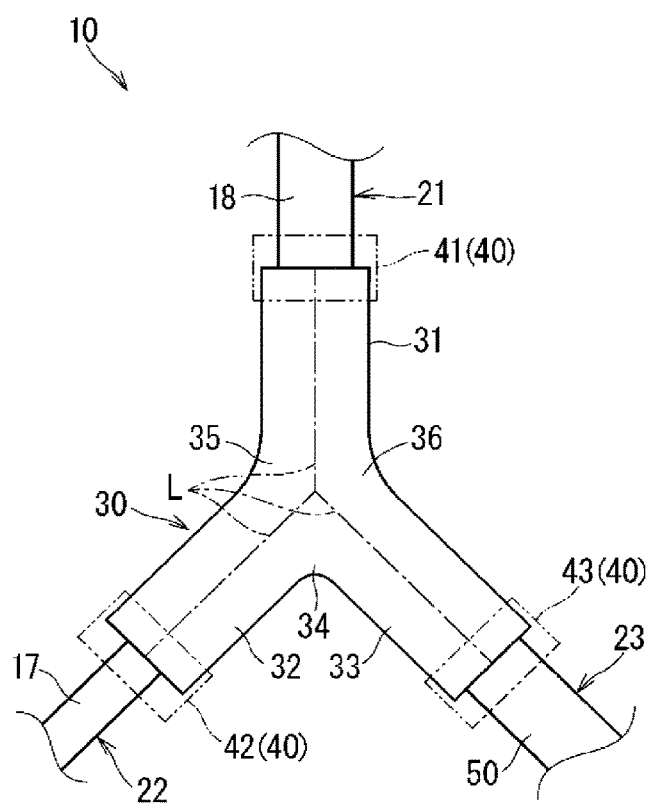
FIG. 2 is a schematic plan view showing the wiring member according to Embodiment 1.
Figure 3:
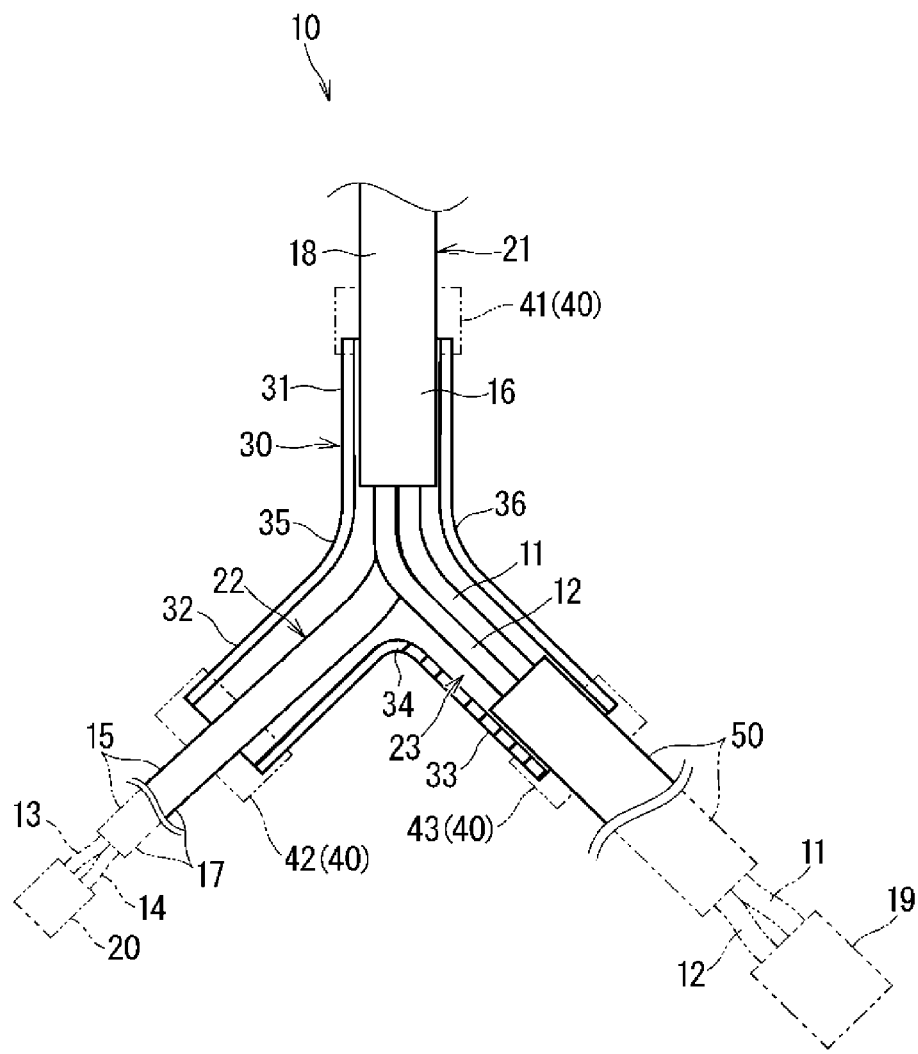
FIG. 3 is a schematic vertical cross-sectional view showing the wiring member according to Embodiment 1.
Figure 4:
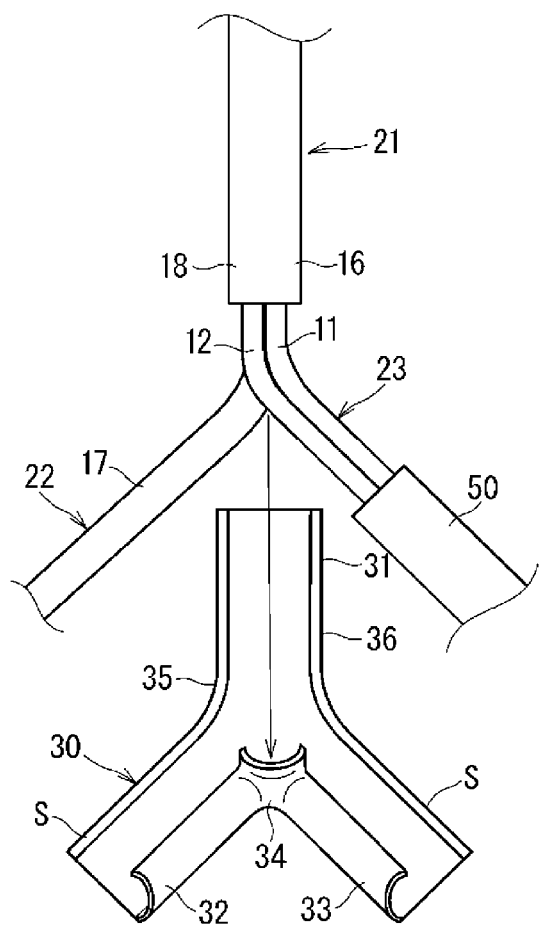
FIG. 4 is a diagram for describing how an electrical wire is housed in a retaining member.
Figure 5:
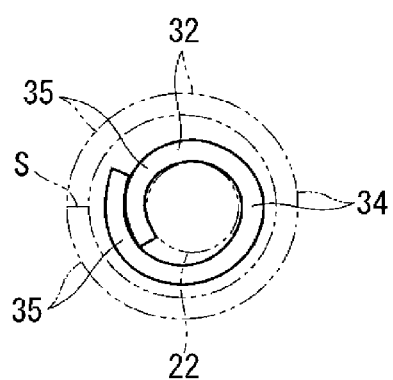
FIG. 5 is a diagram for describing how a cylindrical portion is made smaller.
Figure 6:
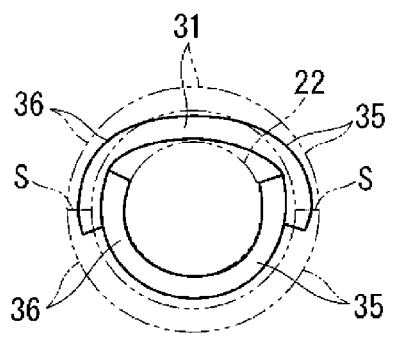
FIG. 6 is a diagram for describing how a cylindrical portion is made smaller.

Hereinafter, a wiring member according to Embodiment 1 will be described. FIG. 1 is a schematic perspective view showing a wiring member 10 according to Embodiment 1. FIG. 2 is a schematic plan view showing the wiring member 10 according to Embodiment 1. FIG. 3 is a schematic vertical cross-sectional view showing the wiring member 10 according to Embodiment 1. FIG. 4 is a diagram for describing how electrical wires 11, 12, 13, and 14 are housed in a retaining member 30. FIG. 5 is a diagram for describing how a cylindrical portion 32 is made smaller. FIG. 6 is a diagram for describing how a cylindrical portion 31 is made smaller.

The wiring member 10 is used as wiring for connecting electrical devices to each other in a vehicle, for example. The wiring member 10 is described as being a wiring member 10 in an undercarriage of a vehicle. The wiring member 10 connects a vehicle body-side device and a wheel-side device to each other. The wiring member 10 may be used in another location in the vehicle. The wiring member 10 includes the electrical wires 11, 12, 13, and 14, the retaining member 30, and fixing members 40. Here, four electrical wires are included. The number of electrical wires may be two, three, or five or more. The electrical wires 11, 12, 13, and 14 are branched. The retaining member 30 covers the electrical wires 11, 12, 13, and 14 at a branching position. The retaining member 30 is closed via the fixing members 40. The fixing members 40 fix the retaining member 30 to the electrical wires 11, 12, 13, and 14. The branched shape of the electrical wires 11, 12, 13, and 14 is retained by the retaining member 30 and the fixing members 40.

The electrical wires include n electrical wire portions. The n electrical wire portions are portions of electrical wires that extend from the branching position in mutually different directions. n is an integer of three of more. Below, the following description assumes n=3. In other words, the electrical wires 11, 12, 13, and 14 include three electrical wire portions 21, 22, and 23. Provided no contradiction arises in the following description, this also applies to cases where n≥4.

All of the electrical wires are branched so as to extend from one of the n electrical wire portions to the other (n−1) electrical wire portions. Specifically, the electrical wires 11 and 12 extend from the electrical wire portion 21 to the electrical wire portion 23, and the electrical wires 13 and 14 extend from the electrical wire portion 21 to the electrical wire portion 22. No electrical wire extends from the electrical wire portion 22 to the electrical wire portion 23. The electrical wire portion 21 is a trunk wire 21, and the electrical wire portions 22 and 23 are branch wires 22 and 23. The three electrical wire portions 21, 22, and 23 form one trunk wire 21, and two branch wires 22 and 23 that are branched from the trunk wire 21, respectively. Naturally, a configuration where all electrical wires are branched so as to extend from one of the n electrical wire portions to the other (n−1) electrical wire portions is not an essential configuration. The plurality of electrical wires may include an electrical wire that extends from the electrical wire portion 22 to the electrical wire portion 23.

The four electrical wires 11, 12, 13, and 14 are coated electrical wires. Each coated electrical wire includes a core wire and a coating layer that covers the core wire. The core wire or includes a single or a plurality of strands. Each strand is made of a conductor such as copper, a copper alloy, aluminum, an aluminum alloy, or the like. The coating layer is made of an insulating material such as resin. The coating layer is formed by performing extrusion molding on the core wire using an insulating material, or applying and then firing the insulating material on the core wire. The four electrical wires 11, 12, 13, and 14 are each a single core electrical wire that forms a conductive path.

A sheath 15 is provided surrounding the two electrical wires 13 and 14. The two electrical wires 13 and 14 form a cable 17 at a section including the branching position. A sheath 16 is provided surrounding the one cable 17 and the two remaining electrical wires 11 and 12, in the trunk wire 21. The electrical wires 11, 12, 13, and 14 form a cable 18 in the trunk wire 21. The cable 18 includes the electrical wires 11, 12, 13, and 14 (here, the electrical wires 11 and 12, and the cable 17) and the sheath 16 that covers them. The sheaths 15 and 16 are made of a material such as resin. Note that one or both of the sheaths 15 and 16 may be omitted.

The two electrical wires 11 and 12 and the one cable 17 branch from each other at the branching position. The two electrical wires 11 and 12 and the cable 17 extend from an end portion of the sheath 16 and branch from a position immediately near the end portion. Accordingly, the end portion of the sheath 16 can be considered as being located at the branching position. The end portion of the sheath 16 is covered by the retaining member 30.

In the undercarriage wiring member 10, the electrical wires 11 and 12 are used for an electric parking brake (EPB). The electrical wires 11 and 12 are power wires. End portions of the electrical wires 11 and 12 are connected to an EPB via a connector 19, for example. The cable 17 is used in an antilock braking system (ABS) sensor. The electrical wires 13 and 14 of the cable 17 are signal wires. End portions of the electrical wires 13 and 14 are inserted into a sensor head 20 or the like, for example. Naturally, the application, the connection destination, the connection structure, and the like of the electrical wires 11, 12, 13, and 14 are not limited to that described above, and may be set as necessary.

The retaining member 30 is an elastic member. The retaining member 30 is a molded component made of an elastic material (elastomer). The elastic material may be a thermoplastic elastomer or a thermosetting elastomer. The thermosetting elastomer may be natural rubber or a synthetic rubber such as a urethane rubber or a silicone rubber. The retaining member 30 includes n (here, three) cylindrical portions 31, 32, and 33. The base end portions of each of the n cylindrical portions 31, 32, and 33 are connected to each other. The base end portions of the n electrical wire portions 21, 22, and 23 are respectively housed in the n cylindrical portions 31, 32, and 33. The shape of a transverse section of the cylindrical portions 31, 32, and 33 may be a circular shape or a polygonal shape such as a quadrangle. One or two adjacent cylindrical portions of the n cylindrical portions 31, 32, and 33 are base cylindrical portions, and the remaining (n−2) or (n−1) cylindrical portion is a divided cylindrical portion. Here, the cylindrical portion 31 is a divided cylindrical portion, and the cylindrical portions 32 and 33 are base cylindrical portions.

The divided cylindrical portion is a cylindrical portion in which slits S extending over the entire length thereof are formed on two sides. Slits S are formed on the left and right side portions of the cylindrical portion 31 on both sides of the line L shown in FIG. 2 extending over the entire length thereof. The cylindrical portion 31, which is the divided cylindrical portion, is completely separated into two parts by the two slits S.

The base cylindrical portions are cylindrical portions in which a slit S extending over the entire length thereof is formed on one side. Of the left and right side portions on both sides of the line L on the cylindrical portion 32 as seen in FIG. 2, a slit S extending over the entire length thereof is formed on the left side portion. Of the upper and lower side portions on either side of the line L on the cylindrical portion 33 as seen in FIG. 2, a slit S extending over the entire length thereof is formed on only the upper side portion. Two end portions of each base cylindrical portion that are separated by a slit S are connected on another side portion. The base cylindrical portions are provided with linking portions that connect the two end portions separated by the slits S. The entire longitudinal portions of the cylindrical portions 32 and 33 are linking portions. As a result of the cylindrical portions 32 and 33 including linking portions, full separation thereof into two members can be suppressed even if a slit S is provided. By including the cylindrical portions 32 and 33 that are the base cylindrical portions, it is possible to keep the retaining member 30 provided with the slits S from completely separating into two members. It is sufficient that the portions of the base cylindrical portions not provided with a slit S are at least continuous. In other words, a slit may be formed in a portion of a linking portion.

The slits S formed on the same side portions of two adjacent cylindrical portions of the cylindrical portions 31, 32, and 33 are connected to each other. Specifically, the slits S formed on the left side portions of the cylindrical portions 31 and 32 as seen in FIG. 2 are connected to each other. Also, the slit S formed on the right side portion of the cylindrical portion 31 as seen in FIG. 2 and the slit S formed on the upper side portion of the cylindrical portion 33 as seen in FIG. 2 are connected to each other. Note that FIG. 3 is a cross-section of the retaining member 30 taken along a plane passing through the slits S.

The slits S are linear. The slits S may have a shape different from a linear shape such as a wave shape, for example. The linear slits S are parallel to corresponding axial directions. The linear slits S may be slightly inclined relative to the axial directions.

Here, the electrical wire portion 21 (trunk wire 21) is housed in the cylindrical portion 31, the electrical wire portion 22 (branch wire 22) is housed in the cylindrical portion 32, and the electrical wire portion 23 (branch wire 23) is housed in the cylindrical portion 33. An end portion of the sheath 16 is covered by the cylindrical portion 31.

As shown in FIG. 4, the retaining member 30 can be opened and closed from the cylindrical portions 32 and 33, which are the base cylindrical portions, before being attached to the electrical wires 11, 12, 13, and 14. More specifically, portions of the cylindrical portions 32 and 33 that oppose a slit S act as hinges, and the retaining member 30 is opened from the slits S.

As described above, here, the two cylindrical portions 32 and 33 that house the two branch wires 22 and 23 are the base cylindrical portions. Thus, as shown in FIG. 4, when the electrical wires 11, 12, 13, and 14 are housed in the retaining member 30, the portion between the branch wires 22 and 23 (end portion of sheath 16) can be abutted against the cylindrical portions 32 and 33. Accordingly, the electrical wires 11, 12, 13, and 14 and the retaining member 30 can be easily positioned.

The retaining member 30 has a Y shape. That is, adjacent cylindrical portions all extend in mutually intersecting directions. Here, the cylindrical portions 32 and 33 extend in orthogonal directions. Here, all angles formed by adjacent cylindrical portions are smaller than 180 degrees. Naturally, the directions in which the cylindrical portions of the retaining member extend are not limited to those above. For example, the retaining member may have a T shape or the like. In other words, two of the three cylindrical portions may be connected in a straight line. Also, for example, an angle formed by adjacent cylindrical portions may be larger than 180 degrees. Furthermore, all angles formed by adjacent cylindrical portions may be the same, for example. Also, all angles formed by adjacent cylindrical portions may differ, for example.

The angle formed by the cylindrical portions 32 and 33 is smaller than or equal to the angle formed by the cylindrical portions 31 and 32 and the angle formed by the cylindrical portions 31 and 33. Thus, the angle formed by the branch wires 22 and 23 can be kept small. Here the angle formed by the cylindrical portions 32 and 33 is 90 degrees. The angles formed by the cylindrical portions 31 and 32 and cylindrical portions 31 and 33 are each 135 degrees.

The original thicknesses (inner and outer diameters) of the cylindrical portions 31, 32, and 33 are all the same. Here, the original thickness of the cylindrical portions 31, 32, and 33 is the thickness when two side portions interposed by a slit S are in contact with each other, as shown with the virtual lines in FIGS. 5 and 6. If the slit S is to be formed in a later process, the original thicknesses of the cylindrical portions 31, 32, and 33 can also be considered to be the thicknesses of the cylindrical portions 31, 32, and 33 prior to the slits S being formed. The original thicknesses of the cylindrical portions 31, 32, and 33 are not particularly limited and can be set as appropriate. For example, the original inner diameters of the cylindrical portions 31, 32, and 33 may be the same as or larger than the outer diameter of the thickest electrical wire portion of the electrical wire portions 21, 22, and 23. Also, for example, the original inner diameters of the cylindrical portions 31, 32, and 33 may be the same as or smaller than the outer diameter of the thinnest electrical wire portion of the electrical wire portions 21, 22, and 23. Also, for example, the original inner diameters of the cylindrical portions 31, 32, and 33 may be set to be smaller than the outer diameter of the thickest electrical wire portion of the electrical wire portions 21, 22, and 23 and larger than the outer diameter of the thinnest electrical wire portion of the electrical wire portions 21, 22, and 23. Note that the original thicknesses of the cylindrical portions 31, 32, and 33 need not all be the same, and the thicknesses of the cylindrical portions 31, 32, and 33 may be partially different.

The cylindrical portions 31, 32, and 33 all have the same length. The lengths of the cylindrical portions 31, 32, and 33 are not particularly limited, and can be set as appropriate. For example, the lengths of the cylindrical portions 31, 32, and 33 may be greater than the outer diameters of the cylindrical portions 31, 32, and 33. Note that there is no need for the lengths of the cylindrical portions 31, 32, and 33 to all be the same, and at least one of the cylindrical portions 31, 32, and 33 may have a different length.

The retaining member 30 can be considered as having the following configuration, with focus on semi-cylindrical portions 34, 35, and 36. Here, the semi-cylindrical portions 34, 35, and 36 are portions including semi-cylindrical regions of adjacent cylindrical portions 31, 32, and 33 of the retaining member 30, respectively. The lines L shown in FIGS. 1 and 2 demarcate the semi-cylindrical portions 34, 35, and 36. The lines L extend from the center at the branching position to end portions of the cylindrical portions 31, 32, and 33. As shown in FIGS. 1 and 2, the retaining member 30 including the n cylindrical portions 31, 32, and 33 includes the n semi-cylindrical portions 34, 35, and 36. Note that the names of the semi-cylindrical portions 34, 35, and 36 are for the convenience of indicating that they are portions of the retaining member 30. The semi-cylindrical portions 34, 35, and 36 are not cut off from each other in the retaining member 30, and the semi-cylindrical portions 34, 35, and 36 are joined to each other in the circumferential direction of the retaining member 30.

One of the n semi-cylindrical portions 34, 35, and 36 of the retaining member 30 is a first semi-cylindrical portion, and the remaining (n−1) semi-cylindrical portions are second semi-cylindrical portions. The first semi-cylindrical portion is a semi-cylindrical portion that extends continuously in a direction surrounding the electrical wire portion at at least a portion between an opening portion of one of the two cylindrical portions to which the first semi-cylindrical portion belongs, and an opening portion of the other cylindrical portion. Each second semi-cylindrical portion is a semi-cylindrical portion in which a slit S is formed extending over the entire length from an opening portion of one of the two cylindrical portions to which the second semi-cylindrical portion belongs, to the opening portion of the other cylindrical portion. The second semi-cylindrical portions are completely separated into two by the slits S. The first semi-cylindrical portion is not completely separated into two. Here, the semi-cylindrical portion 34 is the first semi-cylindrical portion, and the semi-cylindrical portions 35 and 36 are the second semi-cylindrical portions.

The semi-cylindrical portion 34 includes the right half portion of the cylindrical portion 32 as seen in FIG. 2 and the lower half portion of the cylindrical portion 33 as seen in FIG. 2. The semi-cylindrical portion 34 extends continuously in directions surrounding the electrical wire portions 22 and 23 at at least a portion between an opening portion of the one cylindrical portion 32 of the two cylindrical portions 32 and 33 and an opening portion of the other cylindrical portion 33.

The semi-cylindrical portion 35 includes the left half portions of the cylindrical portions 31 and 32, as seen in FIG. 2. In the semi-cylindrical portion 35, a slit S is formed extending the entire length from the opening portion of one cylindrical portion 31 of two cylindrical portions 31 and 32 to the opening portion of the other cylindrical portion 32.

The semi-cylindrical portion 36 includes the right half portion of the cylindrical portion 31 as seen in FIG. 2 and the upper half portion of the cylindrical portion 33 as seen in FIG. 2. In the semi-cylindrical portion 36, a slit S is formed extending the entire length from the opening portion of one cylindrical portion 31 of two cylindrical portions 31 and 33 to the opening portion of the other cylindrical portion 33.

The retaining member 30 can be opened and closed around the semi-cylindrical portion 34 before being attached to the electrical wires 11, 12, 13, and 14. The semi-cylindrical portion 34 mostly functions as a hinge when the retaining member 30 is being opened or closed.

The fixing members 40 hold the retaining member 30 in the closed orientation. By providing the fixing members 40, the retaining member 30 is kept from opening/closing from the cylindrical portions 32 and 33 (around the semi-cylindrical portion 34), which are the base cylindrical portions. Here, the fixing members 40 are pieces of adhesive tape 41, 42, and 43, respectively.

The adhesive tape 41 is wound around the cylindrical portion 31 and the electrical wire portion 21 extending from the opening portion of the cylindrical portion 31. Similarly, the adhesive tape 42 is wound around the cylindrical portion 32 and the electrical wire portion 22 extending from the opening portion of the cylindrical portion 32. The adhesive tape 43 is wound around the cylindrical portion 33 and the electrical wire portion 23 extending from the opening portion of the cylindrical portion 33.

The fixing members 40 may fasten the cylindrical portions 31, 32, and 33. The fixing members 40 may be pieces of adhesive tape or bundling members such as zip ties. The bundling members are wound around the cylindrical portions 31, 32, and 33. The bundling members may fasten the cylindrical portions 31, 32, and 33 such that winding pressure is exerted on the electrical wire portions 21, 22, and 23.

Any one or all of the cylindrical portions 31, 32, and 33 may have an original inner diameter that is larger than the outer diameter of the electrical wire portion housed therein. In this case, the cylindrical portions 31, 32, and 33 may be reduced in size (a reduced diameter state). The fixing members 40 may keep the cylindrical portions 31, 32, and 33 in the reduced diameter state. In the state where the diameters of the cylindrical portions 31, 32, and 33 are reduced, portions of the cylindrical portions 31, 32, and 33 overlap in the circumferential direction thereof. For example, as shown in FIG. 5, the portions of the cylindrical portion 32, which is a base cylindrical portion, separated by one slit S are the two end portions in the circumferential direction. These two end portions may overlap each other in the radial direction. Also, for example, as shown in FIG. 6, the cylindrical portion 31, which is the divided cylindrical portion, is separated into two parts by the two slits S. The two end portions of the two portions may respectively overlap each other in the radial direction.

Also, any one or all of the cylindrical portions 31, 32, and 33 may have an original inner diameter that is smaller than the outer diameter of the electrical wire portion housed therein. In this case, the cylindrical portions 31, 32, and 33 increase in size (enter an increased diameter state) as a result of housing the electrical wire portions 21, 22, and 23. When the cylindrical portions 31, 32, and 33 are in the increased diameter state, the two end portions in the circumferential direction of each of the cylindrical portions 31, 32, and 33 may be separated from each other in the circumferential direction, and electrical wire portions 21, 22, and 23 may be exposed from the gaps therebetween.

Also, in any one or all of the cylindrical portions 31, 32, and 33, the original inner diameter may also be the same as the outer diameter of the electrical wire portion housed therein. In this case, portions of the cylindrical portions 31, 32, and 33 are overlapped in the radial direction, and the electrical wire portions 21, 22, and 23 are unlikely to be exposed from a slit S, for example.

The wiring member 10 further includes a protective member 50. The protective member 50 is provided on at least one electrical wire portion of the n electrical wire portions 21, 22, and 23. Here, the protective member 50 is provided on the electrical wire portion 23. The protective member 50 is a separate member from the sheaths 15 and 16.

Here, the protective member 50 is a member with a cylindrical shape. The shape of a transverse section of the cylindrical protective member 50 may be a circular shape or a polygonal shape such as a quadrangle. It is preferable that the cylindrical protective member 50 is configured so as to be able to bend at an intermediate portion thereof. The protective member 50 may be a rubber tube or a corrugated tube, for example.

The rubber tube is a cylindrical member that is made of an elastic material similar to that of the retaining member 30. The elastic material forming the rubber tube may be the same as or different from the elastic material forming the retaining member 30. Even if the rubber tube has a cylindrical shape in which the outer diameter is constant, depending on the characteristics of the material, the intermediate portion can bend.

The corrugated tube is made of a resin material that is harder than the elastic material such as polypropylene or polyamide. The corrugated tube has a shape in which a large diameter cylinder portion and a small diameter cylinder portion are alternatingly continuous with each other in an axial direction thereof. The corrugated tube can bend at the intermediate portion thereof mainly due to characteristics of the shape thereof.

A slit may be provided over the entire length of a side portion of the cylindrical protective member 50. In this case, the electrical wires 11 and 12 are housed in the protective member 50 opened from the slit. A slit S does not necessarily need to be formed over the entire length of the protective member 50. In this case, the electrical wires 11 and 12 are inserted from the opening of one end portion of the protective member 50.

One end portion of the protective member 50 is covered by the cylindrical portion 33. If the protective member 50 is to be housed in the cylindrical portion 33, the thickness of the protective member 50 is set to the thickness of the electrical wire portion 23 housed in the cylindrical portion 33. The adhesive tape 43 is wound around the cylindrical portion 33 and the protective member 50.

The length of the protective member 50 is not particularly limited. For example, the protective member 50 may be provided so as to extend to the end portions of the electrical wire portions 21, 22, and 23.

Effects, Etc. of Embodiment 1

According to the retaining member 30 with the aforementioned configuration and the wiring member 10 that includes the retaining member 30, the retaining member 30 includes the cylindrical portions 32 and 33, which are base cylindrical portions, and the cylindrical portion 31, which is a divided cylindrical portion. The retaining member 30 can be opened/closed from the cylindrical portions 32 and 33, which are base cylindrical portions, before being attached to the electrical wires 11, 12, 13, and 14. Thus, the operation of inserting the electrical wire portions 21, 22, and 23 from the end portion openings of the cylindrical portions 31, 32, and 33 is not required, and the electrical wire portions 21, 22, and 23 can be easily housed in the cylindrical portions 31, 32, and 33. By housing the electrical wire portions 21, 22, and 23 in the cylindrical portions 31, 32, and 33 and providing the fixing members 40, the branched shape can be retained. Accordingly, the branched shape can be easily retained. In comparison to a case where adhesive tape is directly wound around the electrical wires 11, 12, 13, and 14 and the branched shape is retained only using wound tape, the branched shape can be easily retained. The retaining member 30 is an elastic member, and thus the retaining member 30 can be made smaller and be deformed. Thus, the space for disposing the wiring member 10 can be easily secured.

Also, the wiring member 10 further includes the protective member 50, and thus the electrical wire portion 23 is protected by the protective member 50. The protective member 50 is a cylindrical member, and thus, by housing the electrical wire portion 23 in the cylindrical protective member 50, a portion of the electrical wire portion 23 corresponding to the length of the protective member 50 is protected. One end portion of the protective member 50 is covered by the cylindrical portion 33, and thus the electrical wire portion 23 to which the protective member 50 is attached can be kept from being exposed at the portion where the electrical wire portion 23 extends from the retaining member 30.

The end portion of the sheath 16 is covered by the cylindrical portion 31, and thus the electrical wires 11, 12, 13, and 14 are protected by the sheath 16 in the trunk wire 21.

Also, the two cylindrical portions 32 and 33 that house the two branch wires 22 and 23 form the base cylindrical portions, and thus the portion where the leading end of the trunk wire 21 branches into the two branch wires 22 and 23 (end portion of sheath 16) can be abutted against the cylindrical portions 32 and 33. Thus, the retaining member 30 can be easily positioned relative to the electrical wires 11, 12, 13, and 14. The angle formed by the cylindrical portions 32 and 33 is equal to or smaller than the angle formed by the cylindrical portions 31 and 32 and the angle formed by the cylindrical portions 31 and 33, and thus the angle between the two branch wires 22 and 23 is reduced.

Also, the three cylindrical portions 31, 32, and 33 all have the same thickness, and thus the versatility of the retaining member 30 is increased.

Embodiment 2

Figure 7:
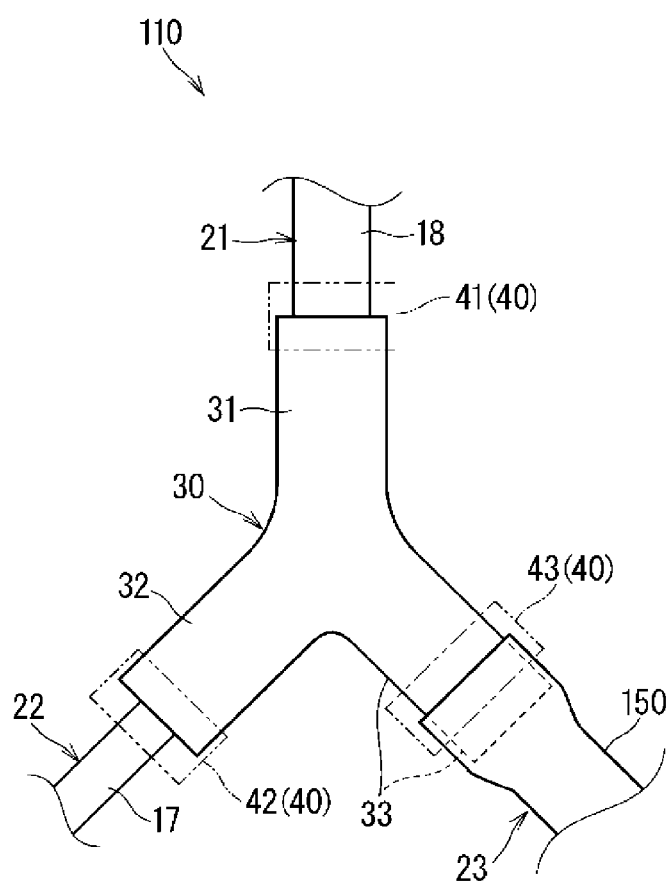
FIG. 7 is a schematic plan view showing a wiring member according to Embodiment 2.

A wiring member according to Embodiment 2 will be described. FIG. 7 is a schematic plan view showing a wiring member 110 according to Embodiment 2. Note that, in the description of the present embodiment, constitutional elements in the description of the present embodiment that are similar to those described above are given the same reference numerals and the descriptions thereof are omitted. This also applies to the descriptions of the following embodiments.

The way in which the cylindrical portion 33 and a protective member 150 overlap in the wiring member 110 differs from the way in which the cylindrical portion 33 and the protective member 50 overlap in the wiring member 10. One end portion of the protective member 150 covers the cylindrical portion 33. With such a wiring member 110, similar effects to those of the above wiring member 10 can also be obtained. Also, with the wiring member 110, the cylindrical portion 33 can be made smaller.

In the example shown in FIG. 7, the portion of the protective member 150 that covers the cylindrical portion 33 has a partially increased diameter compared to a portion of the protective member 150 distanced from the cylindrical portion 33 in the longitudinal direction thereof. The protective member 150 is made of an elastic material for example, and a slit can be formed extending along the entire length in the axial direction thereof, thus allowing an increase in the diameter. The outer diameter of the portion of the protective member 150 distanced from the cylindrical portion 33 in the longitudinal direction may be equal to or smaller than that of the cylindrical portion 33. Naturally, the entire length of the protective member 150 may have a larger diameter than that of the cylindrical portion 33. In this case, the portion of the protective member 150 that covers the cylindrical portion 33 does not necessarily need to have a partially increased diameter.

Embodiment 3

Figure 8:
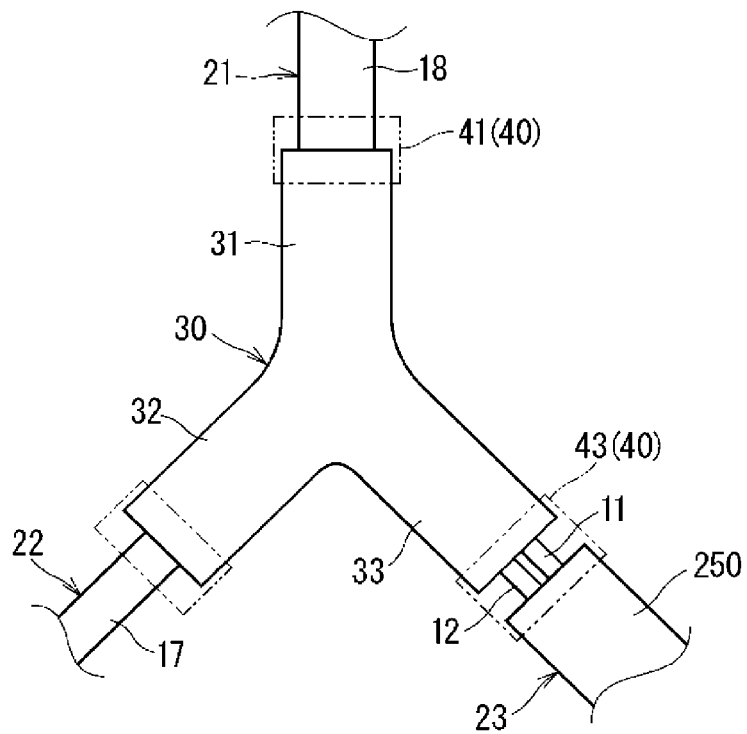
FIG. 8 is a schematic plan view showing a wiring member according to Embodiment 3.

A wiring member according to Embodiment 3 will be described. FIG. 8 is a schematic plan view showing a wiring member 210 according to Embodiment 3.

In the wiring member 210, the position of one end portion of a protective member 250 differs from the positions of one end portions of the protective members 50 and 150 of the wiring members 10 and 110. The one end portion of the protective member 250 is provided outside of the cylindrical portion 33, in the longitudinal direction of the electrical wire portion 23. With such a wiring member 210, the same effects as those of the wiring members 10 and 110 can be obtained except for the effect of the protective member and the cylindrical portion 33 overlapping each other. Also, with the wiring member 210, the protective member 250 and the cylindrical portion 33 are kept from overlapping in the radial direction. Thus, the wiring member 210 is kept from being thick at an end portion of the cylindrical portion 33. There is no need to consider the order in which the protective member 250 and the retaining member 30 are to be attached, and manufacturing conditions are eased.

The thickness of the protective member 250 may be the same as the thickness of the cylindrical portion 33, or one may be thicker than the other.

Note that, in the example shown in FIG. 8, the protective member 250 is provided distanced from the cylindrical portion 33. In this case, adhesive tape 43 may be wrapped such that the electrical wires 11 and 12 therebetween are not exposed. The interval between the protective member 250 and the cylindrical portion 33 in the longitudinal direction of the electrical wire portion 23 is not particularly limited. For example, the interval between the protective member 250 and the cylindrical portion 33 in the longitudinal direction of the electrical wire portion 23 may be the same as or smaller than the width of the adhesive tape 43. Accordingly, when the adhesive tape 43 is wrapped onto the electrical wire portion 23 between the protective member 250 and the cylindrical portion 33, exposure of the electrical wire portion 23 can be suppressed by simply wrapping the adhesive tape 43 at one position. The protective member 250 and the cylindrical portion 33 may be in contact with each other in the longitudinal direction of the electrical wire portion 23.

Embodiment 4

Figure 9:
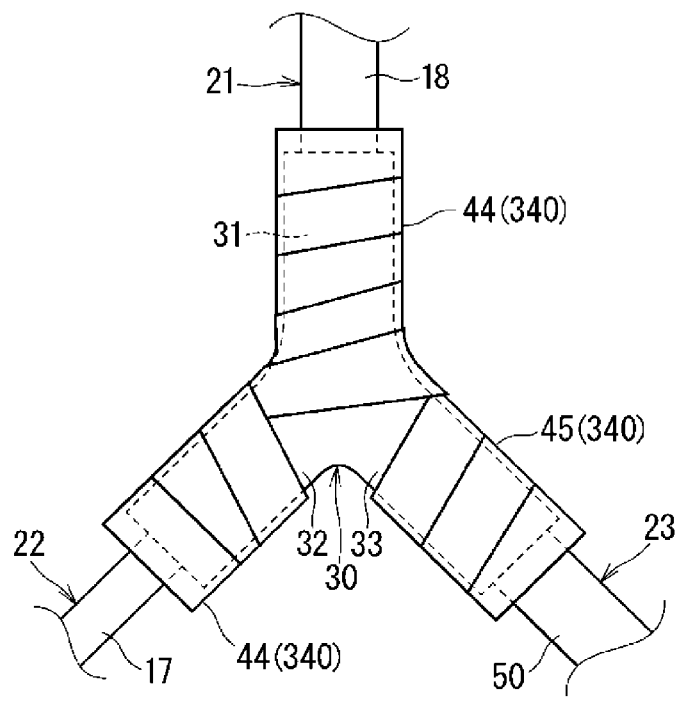
FIG. 9 is a schematic plan view showing a wiring member according to Embodiment 4.

A wiring member according to Embodiment 4 will be described. FIG. 9 is a schematic plan view showing a wiring member 310 according to Embodiment 4.

How pieces of adhesive tape 44 and 45 serving as fixing members 340 are wrapped in the wiring member 310 differs from how the pieces of adhesive tape 41, 42, and 43 are wrapped in the wiring members 10, 110, and 210. The pieces of adhesive tape 44 and 45 completely close off the slits S. Accordingly, foreign matter can be kept from entering the retaining member 30 via the slits S.

In the example shown in FIG. 9, the pieces of adhesive tape 44 and 45 are wrapped in a spiral shape so as to partially overlap the portions wrapped immediately prior thereto. There is no specific limit on the overlapping regions of the pieces of adhesive tape 44 and 45, and the overlapping regions may be portions that make up one half, one third, or two thirds in the width direction of the adhesive tape. Note that a wrapping method in which half of the adhesive tape is overlapped in the width direction is also referred to as half-wrapping, for example. Naturally, the pieces of adhesive tape 44 and 45 that close off the slits S do not necessarily need to be wrapped in a spiral shape. The adhesive tape may be adhered to a region of the retaining member 30 including the slits S such that the longitudinal direction extends along the slits S.

If the pieces of adhesive tape 44 and 45 are to be wound in a spiral shape so as to close off the entirety of the slits S, as shown in FIG. 9, it is sufficient that the adhesive tape 44 is wound in a diagonally braced manner at corner portions (the linking portion of the cylindrical portions 31 and 32 and the linking portion of the cylindrical portion 31 and 33) provided with the slit S at the branched position. The pieces of adhesive tape 44 and 45 may or may not be wrapped around the corner portion (linking portion of the cylindrical portions 32 and 33) not provided with a slit S at the branched position.

The adhesive tape 44 wrapped around the cylindrical portion 32 and the adhesive tape 45 wrapped around the cylindrical portions 33 are not one continuous piece but are separated. The adhesive tape wrapped around the cylindrical portion 31 is continuous with one of the adhesive tape 44 wrapped around the cylindrical portion 32 and the adhesive tape 45 wrapped around the cylindrical portion 33 (here, the adhesive tape 44 wrapped around the cylindrical portion 32). That is, the adhesive tape 44 that is continuous around the cylindrical portion 31 and the cylindrical portion 32 is wound in a spiral shape. The adhesive tape 44 may be wound starting from the opening portion side of the cylindrical portion 31 or wound starting from the opening portion side of the cylindrical portion 32. The adhesive tape 45, which is separate from the adhesive tape 44 wrapped around the cylindrical portion 31 and the cylindrical portion 32, is wrapped around the cylindrical portion 33. The adhesive tape 45 may be wound starting from the opening portion side of the cylindrical portion 33 or wound starting from branching position side.

Variations

The right side portion of the cylindrical portion 32 and the lower side portion of the cylindrical portion 33 in FIG. 2, that is, the semi-cylindrical portion 34, was described as not having any slit S, but this is not an essential configuration. A slit may be formed in a portion of the semi-cylindrical portion 34. A slit may be formed over the entire length of one of the right side portion of the cylindrical portion 32 and the lower side portion of the cylindrical portion 33, for example. In this case, the cylindrical portion provided with the slit is a divided cylindrical portion instead of a base cylindrical portion. Also, for example, one or both of the right side portion of the cylindrical portion 32 and the lower side portion of the cylindrical portion 33 may be provided with an intermediate slit. An intermediate slit is a slit where one end portion of the slit is located at the intermediate portion of the cylindrical portion in the longitudinal direction thereof. The other end portion of the intermediate slit may be located at the opening portion of the cylindrical portion, may be located at a side end portion at the branched position of the cylindrical portion, or located at an intermediate portion in the longitudinal direction. If a slit is formed in a portion of the semi-cylindrical portion 34, the retaining member 30 can be easily opened around the semi-cylindrical portion 34.

While the cylindrical portions 31, 32, and 33 were described as being two-dimensionally branched, the cylindrical portions 31, 32, and 33 may be three-dimensionally branched. The cylindrical portions being planarly branched refers to a state where, when two of the cylindrical portions are placed on a flat surface parallel to their axes, the remaining cylindrical portion is also placed on the same flat surface. The cylindrical portions being three-dimensionally branched refers to a state where, when two of the cylindrical portions are placed on a flat surface parallel to their axes, at least one remaining cylindrical portion is not placed on the same flat surface.

The two cylindrical portions 32 and 33 that house the two branch wires 22 and 23 were described as being the base cylindrical portions, but this is not a necessary configuration. At least one of the two cylindrical portions 32 and 33 that house the two branch wires 22 and 23 may be a divided cylindrical portion. For example, one of the branch wires 22 and 23 of the retaining member 30 may be housed in the cylindrical portion 31 and the other of the branch wires 22 and 23 may be housed in either one of the cylindrical portions 32 and 33.

The angle formed by the cylindrical portions 32 and 33 housing the two branch wires 22 and 23 was described as being equal to or smaller than the angle formed by the cylindrical portions 31 and 32 and the angle formed by the cylindrical portions 31 and 33, but this is not an essential configuration. The angle formed by two cylindrical portions housing the two branch wires 22 and 23 may be larger than an angle formed by other cylindrical portions. For example, in the retaining member 30, the branch wires 22 and 23 may be housed in the cylindrical portions 31 and 32.

Also, the fixing members 40 were described as being pieces of adhesive tape or bundling members, but this is not an essential configuration. The fixing members may be an adhesive or the like, for example. An adhesive is, for example, provided in one or all of the cylindrical portions 31, 32, and 33, and the cylindrical portions 31, 32, and 33 are adhered to the electrical wire portions 21, 22, and 23, respectively.

Also, the wiring members 10, 110, 210, and 310 were described as including the protective members 50, 150, and 250, but this is not an essential configuration. The protective members 50, 150, and 250 may be omitted.

Also, the protective members 50, 150, and 250 were described as being members with a cylindrical shape, but this is not an essential configuration. For example, a protective member may be formed by wrapping a protective sheet or the like around an electrical wire portion.

Note that the configurations of the above-described embodiments and variations can be combined as appropriate, provided no contradiction arises.

LIST OF REFERENCE NUMERALS 10, 110, 210, 310 Wiring member
11, 12, 13, 14 Electrical wire
15, 16 Sheath
17, 18 Cable
19 Connector
20 Sensor head
21 Electrical wire portion (trunk wire)
22, 23 Electrical wire portion (branch wire)
30 Retaining member 31 Cylindrical portion (divided cylindrical portion)
32, 33 Cylindrical portion (base cylindrical portion)
34 Semi-cylindrical portion (first semi-cylindrical portion)
35, 36 Semi-cylindrical portion (second semi-cylindrical portion)
40, 340 Fixing member
41, 42, 43, 44, 45 Adhesive tape
50, 150, 250 Protective member
S Slit

What is claimed is:

1. A wiring member comprising:
three or more electrical wire portions extending in different directions from a branching position; and
a retaining member that is an elastic member and covers base end portions of the three or more electrical wire portions,
wherein
the retaining member includes three or more cylindrical portions that are joined to each other at respective base end portions, the three or more cylindrical portions including one or two adjacent cylindrical portions and a remaining cylindrical portion that excludes the one or two adjacent cylindrical portions, each of the three or more cylindrical portions having two sides arranged in a radial direction,
each of the one or two adjacent cylindrical portions is provided with a slit extending over an entire length of only one of the two sides, the slit forming two end portions facing each other,
the remaining cylindrical portion is provided with a pair of slits extending over an entire length of both of the two sides, each of the pair of slits forming two end portions facing each other,
the retaining member is closed via a fixing member, and
the two end portions are configured to overlap each other in the radial direction such that an original inner diameter of at least one of the three or more cylindrical portions is made smaller.

2. The wiring member according to claim 1, further comprising
a protective member having one end portion facing at least one of the three or more electrical wire portions.

3. The wiring member according to claim 2, wherein the protective member is a cylindrical member.

4. The wiring member according to claim 2, wherein the one end portion of the protective member is covered by the cylindrical portion.

5. The wiring member according to claim 2, wherein the one end portion of the protective member covers the cylindrical portion.

6. The wiring member according to claim 2, wherein the one end portion of the protective member is provided outside of the cylindrical portion in a longitudinal direction of the electrical wire portion.

7. The wiring member according to claim 1, wherein
the fixing member is adhesive tape, and
the adhesive tape closes off the entirety of the slits.

8. The wiring member according to claim 1, wherein
one of the three or more electrical wire portions is a trunk wire, and the remaining electrical wire portions are branch wires that are branched from the trunk wire,
the trunk wire is a cable that includes a plurality of electrical wires and a sheath that covers the plurality of electrical wires, and
an end portion of the sheath is covered by the cylindrical portion.

9. The wiring member according to claim 8, wherein
the three or more electrical wire portions are three electrical wire portions, and
the cylindrical portions housing the two branch wires are configured as a base cylindrical portion.

10. The wiring member according to claim 9, wherein an angle formed by the cylindrical portions of the base cylindrical portion is smaller than or equal to respective angles formed by the remaining cylindrical portion, which houses the trunk wire, and either of the cylindrical portions forming the base cylindrical portion.

11. The wiring member according to claim 1, wherein the three or more cylindrical portions all have the same thickness.

12. The wiring member according to claim 1, wherein
the retaining member can be opened/closed from the one or two adjacent cylindrical portions that form a base cylindrical portion in order to house the three of more electrical wire portions, before being attached to the plurality of electrical wires, and
the fixing member keeps the retaining member in a closed orientation.

13. The wiring member according to claim 7, wherein the adhesive tape is wrapped in a spiral shape such that a wrapped portion is partially overlapped by a subsequent wrapped portion.

14. A retaining member comprising
three or more cylindrical portions that are molded components made of an elastic material and are joined to each other at respective base end portions,
wherein
the three or more cylindrical portions include one or two adjacent cylindrical portions that form a base cylindrical portion, and a remaining cylindrical portion that excludes the one or two adjacent cylindrical portions and forms a divided cylindrical portion, each of the three or more cylindrical portions having two sides arranged in a radial direction,
the base cylindrical portion is provided with a slit extending over an entire length of only one of the two sides,
the divided cylindrical portion is provided with a pair of slits extending over an entire length of both of the two sides, and
the retaining member can be opened/closed from the base cylindrical portion.

* * * * *